United States Patent Office 3,713,026
Patented Jan. 23, 1973

3,713,026
APPARATUS FOR GENERATING PULSE TRAINS WITH PREDETERMINED ADJACENT PULSE SPACING
Moritada Kubo, Tokyo, Japan, assignor to Tokyo Shibaura Electric Co., Ltd., Kawasaki-shi, Japan
Filed Dec. 14, 1970, Ser. No. 97,941
Claims priority, application Japan, Dec. 13, 1969, 44/99,841
Int. Cl. H03k 5/13
U.S. Cl. 235—152          5 Claims

ABSTRACT OF THE DISCLOSURE

A program control device for generating a pulse train having predetermined time intervals between adjacent pulses includes a pulse oscillator for generating clock pulses of a predetermined frequency and a counter for generating an output each time it counts up to one of a plurality of preset counts of the clock pulses. Further provided is receiving means, such as a matrix circuit which is responsive to command signals and which receives outputs from the counter for generating signals corresponding to respective preset counts of the counter according to a prescribed programmed order. A shift register produces outputs sequentially from each of the stages thereof responsive to a shift signal, and a logic circuit is connected to the shift register and to the generating means for generating the logical product of one output from the shift register and an output from the receiving means, the output from the logic circuit constituting the pulse train output of the program control device. The output of the logic circuit is also fed to the counter to reset the counter and to the shift register to act as the shift pulse.

---

This invention relates to a program control device capable of producing programmed output signals with predetermined time spacings from a single counter.

In some applications of a program control device, programmed signals are generated at a predetermined interval for sending a command to another control device. For example, a program control device mounted on a satellite receives from a ground station a command that "disconnect a rocket of a predetermined stage from the satellite after a predetermined number of seconds." In such a case, responsive to such a command the program control device on the satellite operates to control a suitable device for that purpose.

The conventional program control device mounted on a satellite generally comprises an oscillator for generating clock pulses of a definite frequency and a plurality of counters of different capacities for counting the clock pulses from the oscillator through respective switching means. In response to the command signal from the ground station a predetermined switching means operates a counter connected thereto to cause it to generate an output pulse signal after counting a predetermined number of clock pulses inherent to said counter for controlling another control device. For this reason, where the command signal involves a plurality of different commands, it is necessary to install a plurality of counters on the satellite which is of course undesirable for a satellite wherein limitations on the space and weight are essential.

It is an object of this invention to provide a new and improved program control device wherein the operations of a plurality of counters of the prior art device can be achieved by a single counter.

A more specific object of this invention is to provide a novel program control device which occupies a small space and has a small weight.

SUMMARY OF THE INVENTION

In accordance with this invention there is provided a program control device for generating a pulse train having predetermined time intervals between adjacent pulses comprising a pulse oscillator for generating clock pulses of a predetermined frequency, a counter responsive to the clock pulses for generating an output each time the counter counts up to preset counts or numbers of the clock pulses, a generating means responsive to command signals for receiving outputs from the counter and generating signals corresponding to respective preset counts thereof according to a prescribed programmed order, a shift register for producing an output signal sequentially from each of its stages responsive to a shift pulse, a logical operation circuit for generating a logical product of one output from the shift register and an output from the generating means, the signals on the output terminal of the logical operation circuit corresponding to the desired pulse train. The counter is connected to be reset by the output from the logical operation circuit, and the output of the logical operation circuit comprises the shift signal for the shift register.

By increasing the capacity of the counter any number of preset counts may be set therein to accommodate any desired number of commands, thus miniaturizing the program control circuit and improving its reliability.

Figure 1:
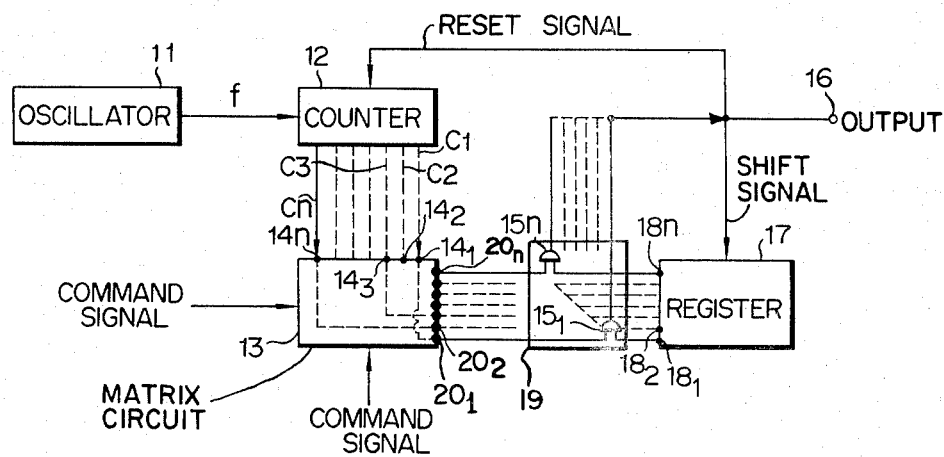
FIG. 1 shows a block diagram of one embodiment of this invention.

With reference now to FIG. 1, clock pulses of a definite frequency generated by an oscillator 11 are counted by a single counter 12 which generates a single output pulse whenever it has counted every preset number of clock pulses from oscillator 11. A plurality of different counts, for example $C_1$, $C_2$, ... $C_n$ are preset. Assuming a relation $C_1 > C_2 > C_3$ ... $> C_n$, when counter 12 counts up $C_n$ clock pulses from the oscillator 11, an output pulse is supplied from counter 12 to a terminal $14_n$ of a program set circuit, for example, a matrix circuit 13 and thereafter when counter 12 counts up to $C_{n-1}$ another pulse signal is applied to another terminal $14_{n-1}$ of the matrix circuit 13. In the same manner, each time the counter 12 counts up $C_2$ or $C_1$, an output pulse is applied to a terminal $14_2$ or $14_1$. The matrix circuit 13 has input terminals $14_1$ to $14_n$ connected to columns, and output terminals $20_1$ to $20_n$ connected to rows. Output terminals $20_1$ to $20_n$ are connected respectively to AND gates $15_1$ to $15_n$ that comprise a logical operation circuit 19. Other inputs of the AND gates $15_1$ to $15_n$ are fed from each stage of a shift register 17. Each AND gate is constructed such that it provides an output when it receives simultaneously an output from a given output terminal of matrix circuit 13 and a given output terminal of shift register 17. The output terminals of various AND GATE circuits are connected to a common output terminal 16 to supply control signals to another control device, not shown.

Assuming now that the command signal from the ground station is such that control signals are supplied to output terminal 16 in the order of preset count numbers $C_1$, $C_n$, $C_3$ . . . of the counter 12, the command signals from the ground station are applied to matrix circuit 13 to connect row 1–column 1, row 2–column 2, row 3–column 3 . . . and so on at the crossing points of the matrix. As above described, terminals $14_1$, $14_n$, $14_3$ . . . are connected to one input terminal of corresponding AND gates $15_1$, $15_2$, $15_3$ . . ., respectively.

Figure 2:
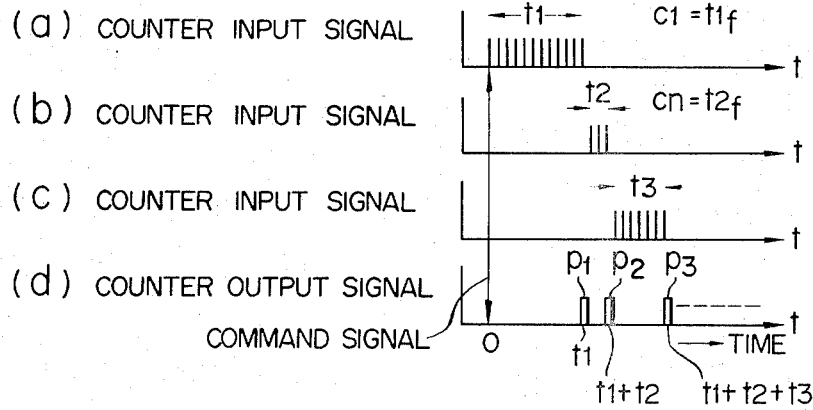
FIG. 2 shows waveforms of pulses to explain the operation of the embodiment shown in FIG. 1.

Under these conditions, if counter 12 counts the clock pulses from oscillator 11 of a number $C_1 = t_1 f$ during an interval $t_1$ starting from a starting point 0, as shown in FIG. 2, signal (a) a pulse $P_1$ will be applied to input terminal $14_1$ of matrix circuit 13 as shown in FIG. 2, signal (d). Shift register. 17 produces DC outputs from its output terminals so that if the register 17 is set to produce its first DC output on terminal $18_1$, then upon receipt of pulse $P_1$ at terminal $14_1$ of matrix circuit 13, AND gate $15_1$ will receive both outputs, thus producing a predetermined control output at terminal 16.

Concurrently therewith, counter 12 is reset by the output appearing at output terminal 16 and the content of shift register 17 is shifted. Then the output appears only at terminal $18_2$ of shift register 17. Upon reset, counter 12 begins to count and when it counts up to the next preset count $C_n = t_2 f$ as shown in FIG. 2b, the counter generates a pulse $P_2$ after an interval $t_2$ following pulse $P_1$. This pulse $P_2$ is applied to terminal $14_n$ of matrix circuit 13. Terminal $14_n$ is connected to one input to AND gate $15_2$ whereas the other input thereof is connected to terminal $18_2$ of shift register 17. As above described, shift register 17 has been shifted to produce the DC output from terminal $18_2$ instead of terminal $18_1$, so that when pulse $P_2$ is impressed upon terminal $14_n$, AND gatee $15_2$ operates to supply a control output to output terminal 16. By repeating similar operations, after a predetermined interval from $C_n$, an output pulse $P_3$ corresponding to the next preset count value $C_3$ is produced at output terminal 16.

Thus there is provided an improved program control device for generating a pulse train having predetermined spacings between adjacent pulses including only one counter which counts a plurality of preset counts up to a predetermined number of clock pulses supplied from a pulse oscillator operating at a definite frequency, wherein the output terminals of the counter are connected to a matrix circuit, command signals are utilized to select prescribed preset counts of the counter according to a program to determine the order of generating the control outputs, a shift register is provided to produce shift pulses to maintain predetermined intervals or time spacings between consecutive control outputs, and each time the control output is generated the counter is reset and the shift register is shifted, thus sequentially producing control signals according to a prescribed program.

What is claimed is:

1. A program control device for generating a pulse train having predetermined time intervals between adjacent pulses comprising:
  a pulse oscillator (11) for generating clock pulses of a predetermined frequency;
  a counter (12) coupled to the output of said pulse oscillator (11) for counting said clock pulses and for producing an output pulse whenever it counts up to preset numbers of clock pulses;
  generating means (13) coupled to the output of said counter (12) to generate signals corresponding to said preset numbers in a given sequence and according to said predetermined time intervals;
  a shift register (17) receiving a shift pulse, and producing an output signal sequentially from each of the stages thereof responsive to said shift pulse; and
  a logical operation circuit (19) coupled to the outputs of said shift register (17) and to the outputs of said generating means (13) for generating an output signal corresponding to the logical product of one output from said shift register (17) and an output from said generating means (13), said output signal from said logical operation circuit (19) being coupled to said counter (12) to reset said counter (12) and comprising said shift pulse for said shift register, said output signal from said logical operation circuit (19) further corresponding to said pulse train.

2. A program control device according to claim 1 wherein said generating means comprises a matrix circuit including a plurality of input terminals respectively connected to receive output pulses corresponding to a plurality of preset counts of said counter, and means for receiving two different command signals applied to said matrix circuit to select said output pulses from said counter for generating outputs corresponding to said preset numbers in said given sequence.

3. A program control device according to claim 2 wherein said logical operation circuit comprises a plurality of AND gates corresponding to a plurality of preset counts of said counter, one input of each of said AND gates being connected to one output of said matrix circuit, and the other input of each of said AND gates being connected to one respective output of said shift register, and the outputs from said plurality of AND gates being connected to a common output terminal on which appears said pulse train.

4. A program control device according to claim 1 wherein said logical operation circuit comprises a plurality of AND gates corresponding to a plurality of preset counts of said counter, one input of each of said AND gates being connected to one output of said generating means, and the other input of each of said AND gates being connected to one respective output of said shift register, and the outputs from said plurality of AND gates being connected to a common output terminal on which appears said pulse train.

5. A program control device according to claim 4 wherein said common output terminal is coupled to said counter to reset said counter and to said shift register to shift said shift register.

References Cited

UNITED STATES PATENTS

| | | | |
|---|---|---|---|
| 3,596,113 | 7/1971 | Seidler | 328—130 X |
| 3,486,121 | 12/1969 | Kintzinger | 328—130 X |
| 3,363,186 | 1/1968 | Anderson | 328—130 X |
| 3,012,721 | 12/1961 | Fiske | 328—130 X |

OTHER REFERENCES

R. K. Richards, Arithmetic Operations in Digital Computers, 1955, pp. 337–341.

MALCOLM A. MORRISON, Primary Examiner

D. H. MALZAHN, Assistant Examiner

U.S. Cl. X.R.

328—130